United States Patent
Ye

(10) Patent No.: US 9,326,063 B2
(45) Date of Patent: Apr. 26, 2016

(54) MICROPHONE WITH VOICE WAKE-UP FUNCTION

(71) Applicants: SHANGHAI SNIPER MICROELECTRONICS CO., LTD., Shanghai (CN); ZILLTEK TECHNOLOGY CORP., Hsinchu (TW)

(72) Inventor: Jinghua Ye, Shanghai (CN)

(73) Assignees: Shanghai Sniper Microelectronics Co. Ltd. (CN); Zilltek Technology Corp. (TW)

( * ) Notice: Subject to any disclaimer, the term of this patent is extended or adjusted under 35 U.S.C. 154(b) by 156 days.

(21) Appl. No.: 14/243,552

(22) Filed: Apr. 2, 2014

(65) Prior Publication Data

US 2015/0049884 A1   Feb. 19, 2015

(30) Foreign Application Priority Data

Aug. 16, 2013   (CN) .......................... 2013 1 0360826

(51) Int. Cl.
   *H04R 3/00*    (2006.01)
   *G06F 1/32*    (2006.01)
   *G10L 25/48*   (2013.01)
   *G10L 25/78*   (2013.01)

(52) U.S. Cl.
   CPC .. *H04R 3/00* (2013.01); *G06F 1/32* (2013.01); *G10L 25/48* (2013.01); *G10L 25/78* (2013.01); *H04R 2499/11* (2013.01)

(58) Field of Classification Search
   None
   See application file for complete search history.

(56) References Cited

U.S. PATENT DOCUMENTS

| | | | | |
|---|---|---|---|---|
| 2004/0128137 | A1* | 7/2004 | Bush ...................... | G10L 15/26 704/275 |
| 2014/0370855 | A1* | 12/2014 | Koss ....................... | H04R 1/04 455/413 |
| 2015/0289074 | A1* | 10/2015 | Kauppila ............... | H04R 1/406 381/58 |

* cited by examiner

*Primary Examiner* — Thang Tran
(74) *Attorney, Agent, or Firm* — Robert M. Downey, P.A.

(57) ABSTRACT

This present disclosure relates to the speech processing technology, more specifically, to a microphone. A microphone with voice wake-up function includes a microphone body with at least one transducer for collecting sound signals, a control module and a determining module. The microphone body is performed in a sleeping mode or an operating mode through the control module in accordance with the determined result. The invention enables the microphone body to switch between the sleeping mode and the operating mode. The sleeping mode reduces unnecessary power consumption and saves electrical energy. When a certain condition is satisfied, the body of the microphone is activated from the sleeping mode and enters into the normal operating mode.

7 Claims, 1 Drawing Sheet

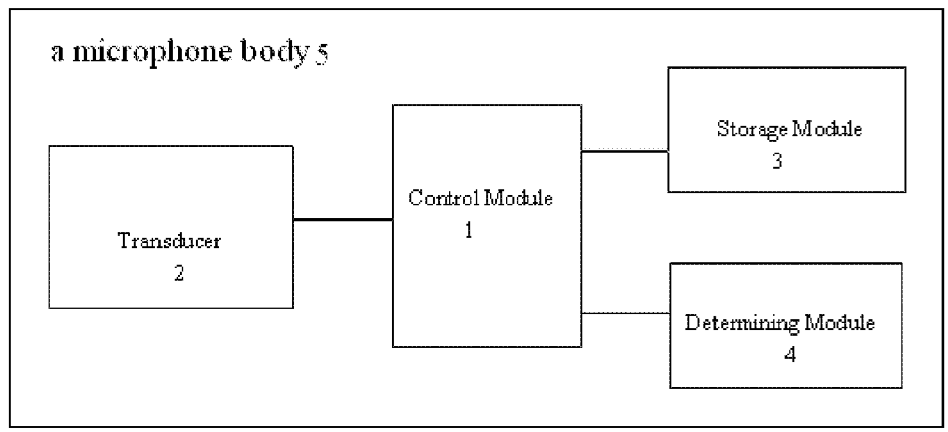

MICROPHONE WITH VOICE WAKE-UP FUNCTION

BACKGROUND OF THE INVENTION

1. Field of the Invention

This present disclosure relates to the speech processing technology, more specifically, to a microphone.

2. Description of the Prior Art

With the development of the mobile terminal and other electronic products, people ask for the better voice communication technology and hope that the electronic products obtains better acoustic performance. However, the present technical microphone initiates to work when power is supplied, which will consume the unnecessary power in an idle state and will be helpless for the energy saving of the mobile terminal.

Meanwhile, for most of the mobile terminal, the present way of transforming the standby mode into the operating mode is normally waked up by the key input or screen touch, which result in the non-ideal interaction between the user and mobile terminal.

SUMMARY OF THE INVENTION

An aspect of an embodiment of the present disclosure is to overcome the above technology problem.

The purpose of this invention is to provide a microphone with voice wake-up function to solve above technology problems.

The microphone with voice wake-up function comprises a microphone body, the microphone body comprises at least one transducer for collecting sound signal, a control module and a determining module, the signal output of the transducer is connected to the control module; wherein the determining module is determined in accordance with a predetermined regulation, which concludes with a determined result; the microphone body is performed in a sleeping mode or an operating mode through the control module in accordance with the determined result.

Preferably, the predetermined regulation is that whether the transducer in a predetermined time range receives the sound signal or the transformed audio signal satisfies with the predetermined condition.

Preferably, when the determining module determines that the transducer in a predetermined time range receives no sound signal or the transformed audio signal does not satisfy with a predetermined condition, the control module is performed to enter into the sleeping mode.

Preferably, when the determining module determines that the transformed audio signal satisfies the predetermined condition, the control module is activated from the sleeping mode and transferred into the operating mode through driving the control module via sending a driving signal.

Preferably, the predetermined condition comprises a predetermined frequency range and/or an amplitude range and/or a continuous audio signal.

Preferably, the frequency range is from 300 Hz to 4 KHz.

Preferably, the present invention further comprises a storage module which storages predetermined condition.

Preferably, the microphone body adopts a simulation microphone based on MEMS or an electret simulation microphone.

A mobile terminal comprises at least one microphone with voice wake-up function of the present invention as mentioned above.

After adopting above technology proposal, this invention makes the microphone body switched between sleeping mode and operating mode. In the sleeping mode, it is available to reduce unnecessary power consumption and save electrical energy. When a certain condition is satisfied, the activation of the main body of the microphone from the sleeping mode will enter the normal operating mode.

BRIEF DESCRIPTION OF THE DRAWINGS

The accompanying drawings, together with the specification, illustrate exemplary embodiments of the present disclosure, and, together with the description, serve to explain the principles of the present disclosure.

FIG. 1 shows a circuit connection diagram of this invention

DETAILED DESCRIPTION OF THE PREFERRED EMBODIMENTS

As referred in FIG. 1, it shows a microphone with voice wake-up function, wherein it comprises a microphone body 5, the microphone body 5 comprises at least one Transducer 2 for collecting sound signal, a Control Module 1 and a Determining Module 4, the signal output of Transducer 2 is connected to Control Module 1; wherein Determining Module 4 is determined in accordance with a predetermined regulation, which concludes with a determined result; the microphone body 5 is performed in a sleeping mode or an operating mode through Control Module 1 in accordance with the determined result.

The microphone body 5 in this invention is determined in accordance with a predetermined regulation, which enables the microphone body 5 to switch between the sleeping mode and the operating mode. In the sleeping mode, it is available to reduce the unnecessary power consumption and to save the electrical energy. When a certain condition is satisfied, the microphone body 5 is activated from the sleeping mode, and then it enters into the normal operating mode.

The above predetermined regulation is that whether Transducer 2 in a predetermined time range receives the sound signal or the transformed audio signal satisfies with the predetermined condition.

When Determining Module 4 determines that Transducer 2 in a predetermined time range receives no sound signal or the transformed audio signal does not satisfy with a predetermined condition, Control Module 1 is performed to enter into the sleeping mode.

When Determining Module 4 determines that the transformed audio signal satisfies the predetermined condition, Control Module 1 is activated from the sleeping mode and transferred into the operating mode through driving Control Module 1 via sending a driving signal.

In one embodiment, the predetermined condition is a predetermined frequency range, which is accomplished by an outside voice. For instance, when the user provided with the electronic product of the above microphone body 5 persists to make a voice, and the voice is collected via a transducer. If the audio signal of the transducer is in the predetermined frequency range, the microphone body 5 will be activated from the sleeping mode by driving Control Module 1. If the audio signal of the transducer is not in the frequency range, then it will be no response, and the microphone body 5 is maintained in the sleeping mode through Control Module 1.

The above mentioned predetermined frequency range is in the range from 300 Hz to 4 KHz. The predetermined frequency range is the frequency range of a normal human voice.

As a further improvement of this embodiment, the predetermined conditions further comprise a predetermined duration. The wakeup of the sleeping mode should exclude the impact of interference signals. Therefore, it shall satisfy that the signal in the predetermined frequency range persists for a while before it wakes up the microphone body.

In another embodiment, the predetermined condition is a predetermined amplitude range, which is accomplished by an outside voice. For instance, when the user provided with the electronic product of the above microphone body 5 persists to make a voice, and the voice is collected via a transducer. If the audio signal of the transducer is in the predetermined amplitude range, the microphone body 5 will be activated from the sleeping mode by driving Control Module 1. If the audio signal of the transducer is not in the predetermined amplitude range, then it will be no response, and the microphone body 5 is maintained in the sleeping mode through Control Module 1.

As a further improvement of this embodiment, the predetermined conditions further comprise a predetermined duration. The wakeup of the sleeping mode should exclude the impact of interference signals. Therefore, it shall satisfy that the signal in the predetermined amplitude range persists for a while before it wakes up the microphone body.

In another embodiment, the predetermined condition is a predetermined amplitude range and a predetermined frequency range, which is accomplished by an outside voice. For instance, when the user provided with the electronic product of the above microphone body 5 persists to make a voice, and the voice is collected via a transducer. If the audio signal of the transducer is in the predetermined amplitude range and meets the condition of the predetermined frequency range, the microphone body 5 will be activated from the sleeping mode by driving Control Module 1. Otherwise, it will be no response, and the microphone body 5 is maintained in the sleeping mode through Control Module 1.

As a further improvement of this embodiment, the predetermined conditions further comprise a duration. The wakeup of the sleeping mode should exclude the impact of interference signals. Therefore, it shall satisfy that the signal in the predetermined frequency range and amplitude range for a while before it activate the microphone body 5 from the sleeping module.

This invention also comprises a Storage Module 3. Storage Module 3 stores the above predetermined condition. Preferably, the storage module adopts a nonvolatile storage module.

In an embodiment, the microphone body 5 adopts a simulation microphone based on microelectromechanical systems (MEMS) or an electret simulation microphone. The predetermined condition of the simulation microphone could be accomplished by adding a filter circuit in the signal output of Transducer 2 in the simulation microphone.

A mobile terminal, wherein it comprises at least one above mentioned microphone with voice wake-up function. This invention can set different regulations and/or conditions in accordance with the different strategies.

While the present disclosure has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A microphone with voice wake-up function, said microphone comprising: a microphone body, the microphone body comprising at least one transducer for collecting a sound signal and producing a transformed audio signal, a control module and a determining module, the signal output of the transducer is connected to the control module; and
wherein the determining module determines whether the transducer, in a predetermined time range, receives the sound signal or the transformed audio signal satisfies with a predetermined condition, which concludes with a determined result; and wherein the microphone body is performed in a sleeping mode or an operating mode through the control module in accordance with the determined result.

2. The microphone with voice wake-up function as disclosed in claim 1, wherein when the determining module determines that the transducer in the predetermined time range receives no sound signal or the transformed audio signal does not satisfy with the predetermined condition, the control module is performed to enter into the sleeping mode.

3. The microphone with voice wake-up function as disclosed in claim 2, wherein once the determining module determines that the transformed audio signal meets the predetermined condition, by transmitting an interrupt signal or an enable signal, the determining module drives the control module and activates the control module from the sleeping mode into the operating mode.

4. The microphone with voice wake-up function as disclosed in claim 1, wherein the predetermined condition comprises a predetermined frequency range, and/or a predetermined amplitude range, and/or a continuous audio signal with predetermined duration range.

5. The microphone with voice wake-up function as disclosed in claim 4, wherein the predetermined frequency range is from 300 Hz to 4 KHz.

6. The microphone with voice wake-up function as disclosed in claim 1, further comprising a storage module which stores the predetermined condition.

7. The microphone with voice wake-up function as disclosed in claim 1, wherein the microphone body adopts an analog microelectromechanical systems (MEMS) microphone or an analog electret condenser microphone.

* * * * *